United States Patent

Wolfrum et al.

Patent Number: 4,757,137
Date of Patent: Jul. 12, 1988

[54] ORTHOTRIFLUOROMETHYL CONTAINING PHENYLAZONAPHTHOL DYESTUFFS

[75] Inventors: Gerhard Wolfrum, Leverkusen; Erich Klauke, Odenthal; Hans-Günter Otten, Leverkusen, all of Fed. Rep. of Germany

[73] Assignee: Bayer Aktiengesellschaft, Leverkusen, Fed. Rep. of Germany

[21] Appl. No.: 534,914

[22] Filed: Sep. 22, 1983

Related U.S. Application Data

[63] Continuation of Ser. No. 391,090, Jun. 22, 1982, abandoned, which is a continuation of Ser. No. 884,960, Mar. 9, 1978, abandoned.

[30] Foreign Application Priority Data

Mar. 19, 1977 [DE] Fed. Rep. of Germany ....... 2712170

[51] Int. Cl.$^4$ .................... C09B 29/01; C09B 29/033; C09B 29/30; C09B 62/02
[52] U.S. Cl. .................................. 534/862; 534/591; 534/592; 534/598; 534/632; 534/633; 534/638; 534/640; 534/644; 534/647; 534/801; 534/802; 534/803; 534/878; 534/880; 564/179; 564/196; 564/422; 564/442
[58] Field of Search ................. 260/198, 199, 152, 156

[56] References Cited

U.S. PATENT DOCUMENTS

| | | | | |
|---|---|---|---|---|
| T874,004 | 5/1970 | Speck | .............................. | 260/198 X |
| 1,408,405 | 2/1922 | Schoner | .............................. | 260/199 |
| 3,142,669 | 7/1964 | Feeman | .............................. | 260/199 |

FOREIGN PATENT DOCUMENTS

| | | | | |
|---|---|---|---|---|
| 1,114,234 | 4/1956 | France | .............................. | 260/198 |
| 850844 | 10/1960 | United Kingdom | .............................. | 260/199 |
| 1,373,928 | 11/1974 | United Kingdom | .............................. | 260/198 |

OTHER PUBLICATIONS

Colour Index, 3rd Edition, vol. 4, #17040, p. 4102 (1971).

Primary Examiner—Floyd D. Higel
Attorney, Agent, or Firm—Sprung, Horn, Kramer & Woods

[57] ABSTRACT

Azo dyestuffs of the formula

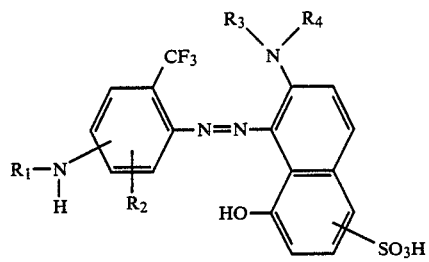

wherein $R_1$ denotes acyl, $R_2$ denotes hydrogen, fluorine, chlorine or trifluoromethyl, $R_3$ denotes hydrogen, optionally substituted $C_1$–$C_4$-alkyl, cyclohexyl or optionally substituted phenyl and $R_4$ denotes hydrogen or $C_1$–$C_4$-alkyl group are suitable for dyeing natural and synthetic fibre materials, for example for dyeing wool or polyamide fibres, in level read to violet shades with very good fastnesses to light, wet processing and perspiration, the color yield being good.

4 Claims, No Drawings

ORTHOTRIFLUOROMETHYL CONTAINING PHENYLAZONAPHTHOL DYESTUFFS

This is a continuation of co-pending application Ser. No. 391,090 filed June 22, 1982, abandoned, which in turn is a continuation of Ser. No. 884,960 filed Mar. 9, 1978, now abandoned.

The invention relates to azo dyestuffs which correspond, in the form of the free acid, to the formula

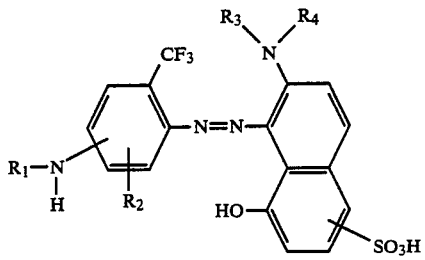

wherein
- $R_1$ denotes acyl,
- $R_2$ denotes hydrogen, fluorine, chlorine or trifluoromethyl,
- $R_3$ denotes hydrogen, optionally substituted $C_1-C_4$-alkyl, cyclohexyl or optionally substituted phenyl and
- $R_4$ denotes hydrogen or $C_1-C_4$-alkyl.

Preferably, the acylamino group is in the p-position relative to the azo group or in the p-position relative to the $CF_3$ group and the sulphonic acid group is in the m-position or p-position relative to the hydroxyl group.

Suitable acyl $R_1$ is, in particular, formyl, $C_1-C_8$-alkylcarbonyl which is optionally monosubstituted by chlorine, bromine, $C_1-C_4$-alkoxy, phenyl or methylphenyl, $C_2-C_4$-alkenylcarbonyl which is optionally monosubstituted by bromine, $C_1-C_4$-alkoxycarbonyl, phenoxycarbonyl, cyclopentylcarbonyl, cyclohexylcarbonyl which is optionally substituted by $C_1-C_4$-alkyl, aminocarbonyl which is optionally monosubstituted or disubstituted by $C_1-C_4$-alkyl or optionally monosubstituted by cyclohexyl, $C_1-C_4$-alkylcyclohexyl, phenyl, $C_1-C_4$-alkylphenyl, chlorophenyl, bromophenyl or trifluoromethylphenyl, benzoyl which is optionally substituted by $C_1-C_4$-alkyl, $C_1-C_4$-alkoxy, hydroxyl, $C_1-C_4$-alkylcarbonyloxy, chlorine, bromine, nitro or trifluoromethyl, naphthylcarbonyl, thenoyl, furoyl, pyridoyl, triazinyl which is substituted by fluorine, chlorine, $OCH_3$ or phenylamino, it being possible for phenylamino to be further substituted by $C_1-C_4$-alkyl, $C_1-C_4$-alkoxy, chlorine or bromine, pyrimidyl which is substituted by fluorine, chlorine, methyl or methylsulphonyl, quinoxaline-6-carbonyl which is substituted by chlorine, quinoxaline-6-sulphonyl which is substituted by chlorine, $C_1-C_4$-alkylsulphonyl, benzenesulphonyl which is optionally substituted by fluorine, chlorine, bromine, trifluoromethyl, $C_1-C_4$-alkyl, $C_1-C_4$-alkoxy, nitro or $C_1-C_4$-alkylcarbonylamino, naphthylsulphonyl, cyclohexylsulphonyl or $C_1-C_4$-dialkylaminosulphonyl.

Possible substituents of the alkyl radicals $R_3$ are, in particular, hydroxyl, cyano, formylamino, $C_1-C_4$-alkylcarbonylamino or benzoylamino which is optionally substituted by methyl, chlorine, bromine or trifluoromethyl. Possible substituents of the phenyl radicals $R_3$ are $C_1-C_4$-alkyl, $C_1-C_4$-alkoxy, chlorine, bromine and trifluoromethyl.

Particularly suitable dyestuffs correspond, in the form of the free acid, to the formula

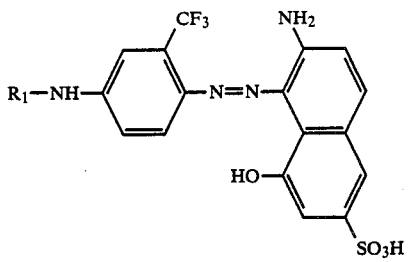

wherein
$R_1$ has the meaning indicated above.

$R_1$ preferably represents $C_1-C_4$-alkylcarbonyl, benzoyl which is optionally substituted by chlorine or methyl, $C_1-C_4$-alkylaminocarbonyl or phenylaminocarbonyl which is optionally substituted by methyl or chlorine.

The dyestuffs of the formula (I) are prepared either by diazotising amines of the formula

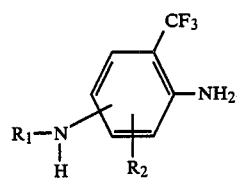

and coupling the diazotisation products with coupling components of the formula

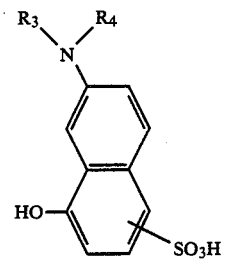

wherein
$R_1$, $R_2$, $R_3$ and $R_4$ have the abovementioned meaning, or by acylating aminoazo dyestuffs of the formula

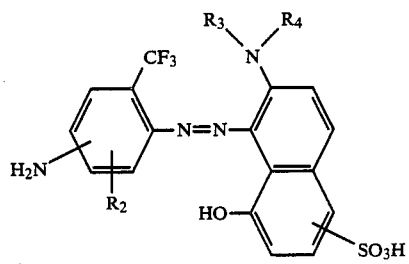

wherein
$R_2$, $R_3$ and $R_4$ have the abovementioned meaning, with the introduction of the radical $R_1$.

Suitable acylating agents are, for example, carboxylic acid halides, carboxylic acid anhydrides, carbamic acid halides, sulphonic acid halides, sulphamic acid halides, isocyanates and heterocyclic compounds with anionic leaving groups.

The dyestuffs according to the invention are suitable for dyeing natural and synthetic fibre materials, for example for dyeing wool or polyamide fibres, in level red to violet shades with very good fastnesses to light, wet processing and perspiration, the colour yield being good. Depending on the substituents $R_1$, $R_3$ or $R_4$, they can be particularly suitable for dyeing polyamide fibres. For example, it is possible to prepare dyestuffs which are already taken up well on polyamide fibres from a neutral to weakly acid dyebath, and also those which are quantitatively taken up only from a weakly to more strongly acid dyebath. In the same manner, it is possible to advantageously influence the ease of combination with yellow and blue acid dyestuffs. Polyamide fibres are understood, in particular, as those consisting of synthetic polyamides, such as ε-polycaprolactam or condensation products of adipic acid and hexamethylenediamine.

Furthermore, dyestuffs of the formula (I) which carry a reactive acyl group are suitable for use as reactive dyestuffs, in accordance with the dyeing processes customary for these, for example for wool or cotton.

EXAMPLE 1

21.8 g of 3-acetylamino-6-amino-benzotrifluoride are dissolved in 350 ml of water and 30 ml of concentrated hydrochloric acid and the solution is cooled to 0° C. and diazotised with a solution of 6.9 g of sodium nitrite in 50 ml of water. After destroying excess nitrous acid with amidosulphonic acid, the diazonium salt solution is added to a solution, cooled to 5° C., of 24.2 g of 6-amino-4-hydroxynaphthalene-2-sulphonic acid in 300 ml of dimethylformamide, which has previously been adjusted to pH 1 by adding about 5 ml of concentrated hydrochloric acid. The coupling is completed very rapidly at this pH value. The mixture is subsequently stirred for 2 hours at room temperature. The reaction product is then filtered off and dried. This gives 44 g of a red powder of the formula

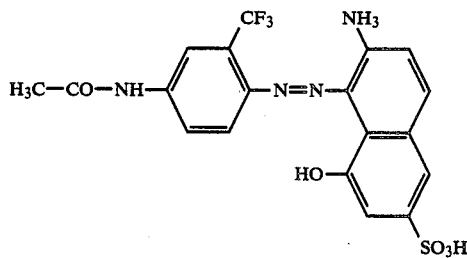

which dyes polyamide fibres in a clear bluish-tinged red from an aqueous solution. A clear, somewhat bluish-tinged red is obtained with this dyestuff on wool.

The 3-acetylamino-6-amino-benzotrifluoride used as the diazo component was obtained as follows:

2-Amino-5-nitrobenzotrifluoride (melting point 91°–92° C.) is catalytically reduced in methanol (Raney nickel as the catalyst). The 2,5-diaminobenzotrifluoride (melting point: 54° to 55° C.) thus obtainable is converted into 3-acetylamino-6-benzotrifluoride (melting point 125° to 126° C.) with acetic anhydride in glacial acetic acid, with the addition of sodium acetate.

EXAMPLE 2

45.6 g of the dyestuff of the formula

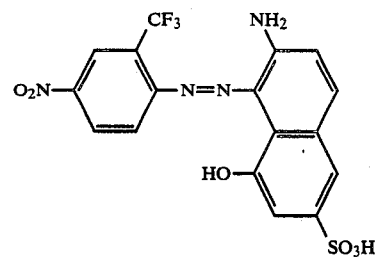

obtained by coupling diazotised 2-amino-5-nitrobenzotrifluoride with 6-amino-4-hydroxynaphthalene-2-sulphonic acid, are dissolved in 400 ml of water by adding an amount of 20% strength sodium hydroxide solution such that the pH value is 7 to 8. After warming the solution to 30° C., 36 g of $Na_2S.9H_2O$, dissolved in 100 ml of water, are added dropwise in the course of 1 hour. The mixture is then subsequently stirred for 1 hour at room temperature. The pH is adjusted to 7 by adding a little hydrochloric acid. Benzoyl chloride and 20% strength sodium hydroxide solution are then added dropwise simultaneously from two dropping funnels. The temperature is kept at 15° to 20° C. by external cooling and the pH value is kept at 5 to 7. After adding 18 g of benzoyl chloride, the acylation has ended, which can be easily determined by following the reaction with a thin layer chromatogram. The dye-stuff is completely precipitated by adding 80 g of sodium chloride and is filtered off.

It has the formula

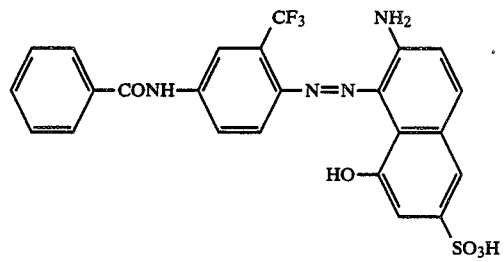

After drying, 49 g of a dark red powder are obtained which dyes polyamide fibres in a bluish-tinged red shade from an aqueous solution.

This dyestuff is also obtained by diazotising 3-benzoyl-amino-6-aminobenzotrifluoride (melting point: 128° to 129° C.) and coupling the diazonium salt with 6-amino-4-hydroxynaphthalene-2-sulphonic acid.

EXAMPLE 3

0.1 g of the dyestuff obtained according to Example 1 is dissolved hot in 100 ml of water. 5 ml of ammonium acetate solution are added and the mixture is diluted to a volume of 500 ml with cold water. 10 g of polyamide fibre material are put into this dyebath and the dyebath is heated to the boil in the course of 20 minutes, 4 ml of 10% strength acetic acid are added and the mixture is kept at the boiling point for 1 hour. Thereafter, the dyed polyamide is taken out of the dyebath, rinsed thoroughly with hot water and dried at 70° to 80° C. This gives a clear bluish-tinged red dyeing.

According to the process indicated in Example 1, when the diazo components and coupling components listed in the table which follows are used, further valuable water-soluble dyestuffs which dye polyamide in the shades indicated from a weakly acid or neutral bath are obtained. The same dyestuffs are also each obtainable, according to the process of Example 2, from the dyestuffs of the formula (V)

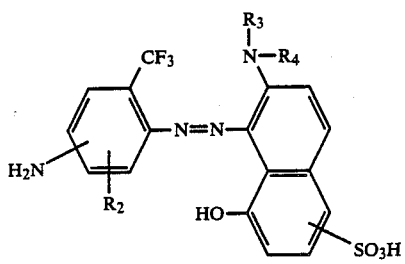

and a corresponding acylating component.

TABLE 1

| Example | Diazo component | Coupling component | Colour shade |
|---|---|---|---|
| 4 | 2-Trifluoromethyl-4-formylamino-aniline | 2-Amino-8-hydroxy-naphthalene-6-sulphonic acid | strongly bluish-tinged red |
| 5 | 2-Trifluoromethyl-4-propionylamino-aniline | 2-Amino-8-hydroxy-naphthalene-6-sulphonic acid | strongly bluish-tinged red |
| 6 | 2-Trifluoromethyl-4-butyrylamino-aniline | 2-Amino-8-hydroxy-naphthalene-6-sulphonic acid | strongly bluish-tinged red |
| 7 | 2-Trifluoromethyl-4-butylcarbonyl-aminoaniline | 2-Amino-8-hydroxy-naphthalene-6-sulphonic acid | strongly bluish-tinged red |
| 8 | 2-Trifluoromethyl-4-amylcarbonyl-aminoaniline | 2-Amino-8-hydroxy-naphthalene-6-sulphonic acid | strongly bluish-tinged red |
| 9 | 2-Trifluoromethyl-4-isobutylcar-bonylaminoaniline | 2-Amino-8-hydroxy-naphthalene-6-sulphonic acid | strongly bluish-tinged red |
| 10 | 2-Trifluoromethyl-4-sec.-butylcar-bonylaminoaniline | 2-Amino-8-hydroxy-naphthalene-6-sulphonic acid | strongly bluish-tinged red |
| 11 | 2-Trifluoromethyl-4-tert.-butylcar-bonylaminoaniline | 2-Amino-8-hydroxy-naphthalene-6-sulphonic acid | strongly bluish-tinged red |
| 12 | 2-Trifluoromethyl-4-(1-ethylpropyl)-carbonylamino-aniline | 2-Amino-8-hydroxy-naphthalene-6-sulphonic acid | strongly bluish-tinged red |
| 13 | 2-Trifluoromethyl-4-(1-ethylamyl)-carbonylamino-aniline | 2-Amino-8-hydroxy-naphthalene-6-sulphonic acid | strongly bluish-tinged red |
| 14 | 2-Trifluoromethyl-4-chloroacetyl-aminoaniline | 2-Amino-8-hydroxy-naphthalene-6-sulphonic acid | bluish-tinged red |
| 15 | 2-Trifluoromethyl-4-(2-chloroethyl)-carbonylamino-aniline | 2-Amino-8-hydroxy-naphthalene-6-sulphonic acid | bluish-tinged red |
| 16 | 2-Trifluoromethyl-4-(3-chloropropyl)-carbonylamino-aniline | 2-Amino-8-hydroxy-naphthalene-6-sulphonic acid | bluish-tinged red |

TABLE 1-continued

| Example | Diazo component | Coupling component | Colour shade |
|---|---|---|---|
| 17 | 2-Trifluoromethyl-4-acryloylamino-aniline | 2-Amino-8-hydroxy-naphthalene-6-sulphonic acid | strongly bluish-tinged red |
| 18 | 2-Trifluoromethyl-4-methacryloyl-aminoaniline | 2-Amino-8-hydroxy-naphthalene-6-sulphonic acid | strongly bluish-tinged red |
| 19 | 2-Trifluoromethyl-4-bromoacryloyl-aminoaniline | 2-Amino-8-hydroxy-naphthalene-6-sulphonic acid | strongly bluish-tinged red |
| 20 | 2-Trifluoromethyl-4-(1,2-dibromo-ethyl)-carbonyl- | 2-Amino-8-hydroxy-naphthalene-6-sulphonic acid | strongly bluish-tinged red |
| 21 | 2-Trifluoromethyl 4-methoxyacetyl-aminoaniline | 2-Amino-8-hydroxy-naphthalene-6-sulphonic acid | strongly bluish-tinged red |
| 22 | 2-Trifluoromethyl-4-methoxycarbonyl-aminoaniline | 2-Amino-8-hydroxy-naphthalene-6-sulphonic acid | strongly bluish-tinged red |
| 23 | 2-Trifluoromethyl-4-ethoxycarbonyl-aminoaniline | 2-Amino-8-hydroxy-naphthalene-6-sulphonic acid | strongly bluish-tinged red |
| 24 | 2-Trifluoromethyl-4-propoxycarbonyl-aminoaniline | 2-Amino-8-hydroxy-naphthalene-6-sulphonic acid | strongly bluish-tinged red |
| 25 | 2-Trifluoromethyl-4-isopropoxycar-bonylaminoaniline | 2-Amino-8-hydroxy-naphthalene-6-sulphonic acid | strongly bluish-tinged red |
| 26 | 2-Trifluoromethyl-4-butoxycarbonyl-aminoaniline | 2-Amino-8-hydroxy-naphthalene-6-sulphonic acid | strongly bluish-tinged red |
| 27 | 2-Trifluoromethyl-4-phenoxycarbonyl-aminoaniline | 2-Amino-8-hydroxy-naphthalene-6-sulphonic acid | strongly bluish-tinged red |
| 28 | 2-Trifluoromethyl-4-benzylcarbonyl-aminoaniline | 2-Amino-8-hydroxy-naphthalene-6-sulphonic acid | strongly bluish-tinged red |
| 29 | 2-Trifluoromethyl-4-(4-methylbenzyl)-carbonylamino-aniline | 2-Amino-8-hydroxy-naphthalene-6-sulphonic acid | strongly bluish-tinged red |
| 30 | 2-Trifluoromethyl-4-(4-methoxy-benzyl)-carbonyl-aminoaniline | 2-Amino-8-hydroxy-naphthalene-6-sulphonic acid | strongly bluish-tinged red |
| 31 | 2-Trifluoromethyl-4-phenoxyacetyl-aminoaniline | 2-Amino-8-hydroxy-naphthalene-6-sulphonic acid | strongly bluish-tinged red |
| 32 | 2-Trifluoromethyl-4-(4-chloro-phenoxy)-acetyl-aminoaniline | 2-Amino-8-hydroxy-naphthalene-6-sulphonic acid | strongly bluish-tinged red |
| 33 | 2-Trifluoromethyl-4-(3-methyl-phenoxy)-acetyl-aminoaniline | 2-Amino-8-hydroxy-naphthalene-6-sulphonic acid | strongly bluish-tinged red |
| 34 | 2-Trifluoromethyl-4-dimethylamino-carbonylamino-aniline | 2-Amino-8-hydroxy-naphthalene-6-sulphonic acid | bluish-tinged red |
| 35 | 2-Trifluoromethyl-4-diethylaminocar-bonylaminoaniline | 2-Amino-8-hydroxy-naphthalene-6-sulphonic acid | bluish-tinged red |
| 36 | 2-Trifluoromethyl-4-methylaminocar-bonylaminoaniline | 2-Amino-8-hydroxy-naphthalene-6-sulphonic acid | bluish-tinged red |

TABLE 1-continued

| Example | Diazo component | Coupling component | Colour shade |
|---|---|---|---|
| 37 | 2-Trifluoromethyl-4-propylaminocarbonylaminoaniline | 2-Amino-8-hydroxynaphthalene-6-sulphonic acid | bluish-tinged red |
| 38 | 2-Trifluoromethyl-4-butylaminocarbonylaminoaniline | 2-Amino-8-hydroxynaphthalene-6-sulphonic acid | bluish-tinged red |
| 39 | 2-Trifluoromethyl-4-tert.-butylaminocarbonylaminoaniline | 2-Amino-8-hydroxynaphthalene-6-sulphonic acid | bluish-tinged red |
| 40 | 2-Trifluoromethyl-4-cyclopentylaminocarbonylaminoaniline | 2-Amino-8-hydroxynaphthalene-6-sulphonic acid | bluish-tinged red |
| 41 | 2-Trifluoromethyl-4-cyclohexylaminocarbonylaminoaniline | 2-Amino-8-hydroxynaphthalene-6-sulphonic acid | bluish-tinged red |
| 42 | 2-Trifluoromethyl-4-cylcohexylcarbonylaminoaniline | 2-Amino-8-hydroxynaphthalene-6-sulphonic acid | bluish-tinged red |
| 43 | 2-Trifluoromethyl-4-(4-methylcyclohexyl)-carbonylaminoaniline | 2-Amino-8-hydroxynaphthalene-6-sulphonic acid | bluish-tinged red |
| 44 | 2-Trifluoromethyl-4-(2-methylcyclohexyl)-carbonylaminoaniline | 2-Amino-8-hydroxynaphthalene-6-sulphonic acid | bluish-tinged red |
| 45 | 2-Trifluoromethyl-4-(4-methylbenzoyl)-aminoaniline | 2-Amino-8-hydroxynaphthalene-6-sulphonic acid | claret |
| 46 | 2-Trifluoromethyl-4-(2-methylbenzoyl)-aminoaniline | 2-Amino-8-hydroxynaphthalene-6-sulphonic acid | claret |
| 47 | 2-Trifluoromethyl-4-(4-methoxybenzoyl)-aminoaniline | 2-Amino-8-hydroxynaphthalene-6-sulphonic acid | claret |
| 48 | 2-Trifluoromethyl-4-(2-methoxybenzoyl)-aminoaniline | 2-Amino-8-hydroxynaphthalene-6-sulphonic acid | claret |
| 49 | 2-Trifluoromethyl-4-(3-methoxybenzoyl)-aminoaniline | 2-Amino-8-hydroxynaphthalene-6-sulphonic acid | claret |
| 50 | 2-Trifluoromethyl-4-(2-ethoxybenzoyl)-aminoaniline | 2-Amino-8-hydroxynaphthalene-6-sulphonic acid | claret |
| 51 | 2-Trifluoromethyl-4-(2-butoxybenzoyl)-aminoaniline | 2-Amino-8-hydroxy naphthalene-6-sulphonic acid | claret |
| 52 | 2-Trifluoromethyl-4-(2-hydroxybenzoyl)-aminoaniline | 2-Amino-8-hydroxynaphthalene-6-sulphonic acid | claret |
| 53 | 2-Trifluoromethyl-4-(2-acetoxybenzoyl)-aminoaniline | 2-Amino-8-hydroxynaphthalene-6-sulphonic acid | claret |
| 54 | 2-Trifluoromethyl-4-(4-chlorobenzoyl)-aminoaniline | 2-Amino-8-hydroxy naphthalene-6-sulphonic acid | claret |
| 55 | 2-Trifluoromethyl-4-(3-chlorobenzoyl)-aminoaniline | 2-Amino-8-hydroxynaphthalene-6-sulphonic acid | claret |
| 56 | 2-Trifluoromethyl-4-(2-chlorobenzoyl)-aminoaniline | 2-Amino-8-hydroxynaphthalene-6-sulphonic acid | claret |
| 57 | 2-Trifluoromethyl-4-(4-bromobenzoyl)-aminoaniline | 2-Amino-8-hydroxynaphthalene-6-sulphonic acid | claret |
| 58 | 2-Trifluoromethyl-4-(4-fluorobenzoyl)-aminoaniline | 2-Amino-8-hydroxynaphthalene-6-sulphonic acid | claret |
| 59 | 2-Trifluoromethyl-4-(3-nitrobenzoyl)-aminoaniline | 2-Amino-8-hydroxynaphthalene-6-sulphonic acid | claret |
| 60 | 2-Trifluoromethyl-4-(3-trifluoromethylbenzoyl)-aminoaniline | 2-Amino-8-hydroxynaphthalene-6-sulphonic acid | claret |
| 61 | 2-Trifluoromethyl-4-phenylaminocarbonylaminoaniline | 2-Amino-8-hydroxynaphthalene-6-sulphonic acid | strongly bluish-tinged red |
| 62 | 2-Trifluoromethyl-4-acetylaminoaniline | 2-Amino-8-hydroxynaphthalene-5-sulphonic acid | strongly bluish-tinged red |
| 63 | 2-Trifluoromethyl-4-butylcarbonylaminoaniline | 2-Amino-8-hydroxynaphthalene-5-sulphonic acid | strongly bluish-tinged red |
| 64 | 2-Trifluoromethyl-4-(1-ethylpentyl)-carbonylaminoaniline | 2-Amino-8-hydroxynaphthalene-5-sulphonic acid | strongly bluish-tinged red |
| 65 | 2-Trifluoromethyl-4-(3-chloropropyl)-carbonylaminoaniline | 2-Amino-8-hydroxynaphthalene-5-sulphonic acid | strongly bluish-tinged red |
| 66 | 2-Trifluoromethyl-4-acryloylaminoaniline | 2-Amino-8-hydroxynaphthalene-5-sulphonic acid | strongly bluish-tinged red |
| 67 | 2-Trifluoromethyl-4-(1,2-dibromopropionylaminoaniline | 2-Amino-8-hydroxynaphthalene-5-sulphonic acid | strongly bluish-tinged red |
| 68 | 2-Trifluoromethyl-4-methoxycarbonylaminoaniline | 2-Amino-8-hydroxynaphthalene-5-sulphonic acid | strongly bluish-tinged red |
| 69 | 2-Trifluoromethyl-4-benzylcarbonylaminoaniline | 2-Amino-8-hydroxynaphthalene-5-sulphonic acid | strongly bluish-tinged red |
| 70 | 2-Trifluoromethyl-4-(2,4-dichlorophenoxy)-acetylaminoaniline | 2-Amino-8-hydroxynaphthalene-5-sulphonic acid | strongly bluish-tinged red |
| 71 | 2-Trifluoromethyl-4-diethylaminocarbonylaminoaniline | 2-Amino-8-hydroxynaphthalene-5-sulphonic acid | strongly bluish-tinged red |
| 72 | 2-Trifluoromethyl-4-cyclohexylcarbonylaminoaniline | 2-Amino-8-hydroxynaphthalene-5-sulphonic acid | strongly bluish-tinged red |
| 73 | 2-Trifluoromethyl-4-benzoylaminoaniline | 2-Amino-8-hydroxynaphthalene-5-sulphonic acid | claret |
| 74 | 2-Trifluoromethyl-4-4-chlorobenzoyl)-aminoaniline | 2-Amino-8-hydroxynaphthalene-5-sulphonic acid | claret |
| 75 | 2-Trifluoromethyl-4-phenylaminocarbonylaminoaniline 4-phenylaminocarbonylaminoaniline | 2-Amino-8-hydroxynaphthalene-5-sulphonic acid | claret |
| 76 | 2-Trifluoromethyl-4-acetylaminoaniline | 2-Methylamino-8-hydroxynaphthalene-6-sulphonic acid | red |
| 77 | 2-Trifluoromethyl-4-benzoylaminoaniline | 2-Methylamino-8-hydroxynaphthalene-6-sulphonic acid | bluish-tinged red |
| 78 | 2-Trifluoromethyl-4-benzylcarbonylaminoaniline | 2-Methylamino-8-hydroxynaphthalene-6-sulphonic acid | red |
| 79 | 2-Trifluoromethyl-4-(4-chlorophenoxy)-acetylaminoaniline | 2-Methylamino-8-hydroxynaphthalene-6-sulphonic acid | red |
| 80 | 2-Trifluoromethyl-4-butylsulphonylaminoaniline | 2-Methylamino-8-hydroxynaphthalene-6-sulphonic acid | red |
| 81 | 2-Trifluoromethyl- | 2-Methylamino-8- | bluish- |

TABLE 1-continued

| Example | Diazo component | Coupling component | Colour shade |
|---|---|---|---|
| | 4-phenylsulphonyl-aminoaniline | hydroxynaphthalene-6-sulphonic acid | tinged red |
| 82 | 2-Trifluoromethyl-4-dimethylaminocarbonylaminoaniline | 2-Methylamino-8-hydroxynaphthalene-6-sulphonic acid | bluish-tinged red |
| 83 | 2-Trifluoromethyl-4-acetylaminoaniline | 2-Dimethylamino-8-hydroxynaphthalene-6-sulphonic acid | red |
| 84 | 2-Trifluoromethyl-4-benzoylaminoaniline | 2-Dimethylamino-8-hydroxynaphthalene-6-sulphonic acid | bluish-tinged red |
| 85 | 2-Trifluoromethyl-4-acetylaminoaniline | 2-Butylamino-8-hydroxynaphthalene-6-sulphonic acid | red |
| 86 | 2-Trifluoromethyl-4-benzoylaminoaniline | 2-Butylamino-8-hydroxynaphthalene-6-sulphonic acid | bluish-tinged red |
| 87 | 2-Trifluoromethyl-4-acetylaminoaniline | 2-(2-Hydroxyethylamino)-8-hydroxynaphthalene-6-sulphonic acid | red |
| 88 | 2-Trifluoromethyl-4-(1-ethylpentyl)-carbonylaminoaniline | 2-(2-Hydroxyethylamino)-8-hydroxynaphthalene-6-sulphonic acid | red |
| 89 | 2-Trifluoromethyl-4-benzoylaminoaniline | 2-(2-Hydroxyethylamino)-8-hydroxynaphthalene-6-sulphonic acid | bluish-tinged red |
| 90 | 2-Trifluoromethyl-4-acetylaminoaniline | 2-(2-Cyanoethylamino)-8-hydroxynaphthalene-6-sulphonic acid | red |
| 91 | 2-Trifluoromethyl-4-benzoylaminoaniline | 2-(2-Cyanoethylamino)-8-hydroxynaphthalene-6-sulphonic acid | bluish-tinged red |
| 92 | 2-Trifluoromethyl-4-acetylaminoaniline | 2-(2-Acetylaminoethylamino)-8-hydroxynaphthalene-6-sulphonic acid | red |
| 93 | 2-Trifluoromethyl-4-benzoylaminoaniline | 2-(2-Acetylaminoethylamino)-8-hydroxynaphthalene-6-sulphonic acid | bluish-tinged red |
| 94 | 2-Trifluoromethyl-4-acetylaminoaniline | 2-(2-Benzoylaminoethylamino)-8-hydroxynaphthalene-6-sulphonic acid | red |
| 95 | 2-Trifluoromethyl-4-acetylaminoaniline | 2-Cyclohexylamino-8-hydroxynaphthalene-6-sulphonic acid | red |
| 96 | 2-Trifluoromethyl-4-benzolyaminoaniline | 2-Cyclohexylamino-8-hydroxynaphthalene-6-sulphonic acid | bluish-tinged red |
| 97 | 2-Trifluoromethyl-4-acetylaminoaniline | 2-Anilino-8-hydroxynaphthalene-6-sulphonic acid | strongly bluish-tinged red |
| 98 | 2-Trifluoromethyl-4-acetylaminoaniline | 2-Dimethylamino-8-hydroxynaphthalene-5-sulphonic acid | red |
| 99 | 2-Trifluoromethyl-4-acetylaminoaniline | 2-Anilino-8-hydroxynaphthalene-5-sulphonic acid | bluish-tinged red |
| 100 | 2-Trifluoromethyl-4-benzoylaminoaniline | 2-Anilino-8-hydroxynaphthalene-5-sulphonic acid | bluish-tinged red |
| 101 | 2-Trifluoromethyl-4-formylamino-5-chloroaniline | 2-Amino-8-hydroxynaphthalene-6-sulphonic acid | strongly bluish-tinged red |
| 102 | 2-Trifluoromethyl-4-acetylamino-5-chloroaniline | 2-Amino-8-hydroxynaphthalene-6-sulphonic acid | strongly bluish-tinged red |
| 103 | 2-Trifluoromethyl-4-(1-ethylpentyl)-carbonylamino-5-chloroaniline | 2-Amino-8-hydroxynaphthalene-6-sulphonic acid | strongly bluish-tinged red |
| 104 | 2-Trifluoromethyl-4-acryloylamino-5-chloroaniline | 2-Amino-8-hydroxynaphthalene-6-sulphonic acid | strongly bluish-tinged red |
| 105 | 2-Trifluoromethyl-4-(1,2-dibromopropionyl)-amino-5-chloroaniline | 2-Amino-8-hydroxynaphthalene-6-sulphonic acid | strongly bluish-tinged red |
| 106 | 2-Trifluoromethyl-4-benzoylamino-5-chloroaniline | 2-Amino-8-hydroxynaphthalene-6-sulphonic acid | claret |
| 107 | 2,5-Bis-trifluoromethyl-4-acetylaminoaniline | 2-Amino-8-hydroxynaphthalene-6-sulphonic acid | violet |
| 108 | 2,5-Bis-trifluoromethyl-4-methylsulphonylaminoaniline | 2-Amino-8-hydroxynaphthalene-6-sulphonic acid | violet |
| 109 | 2,5-Bis-trifluoromethyl-4-benzoylaminoaniline | 2-Amino-8-hydroxynaphthalene-6-sulphonic acid | violet |
| 110 | 2,5-Bis-trifluoromethyl-4-phenylsulphonylaminoaniline | 2-Amino-8-hydroxynaphthalene-6-sulphonic acid | violet |
| 111 | 2-Trifluoromethyl-4-acetylamino-5-chloroaniline | 2-Amino-8-hydroxynaphthalene-5-sulphonic acid | strongly bluish-tinged red |
| 112 | 2,5-Bis-trifluoromethyl-4-acetylaminoaniline | 2-Amino-8-hydroxynaphthalene-5- | strongly bluish-tinged red |
| 113 | 2-Trifluoromethyl-5-acetylaminoaniline | 2-Amino-8-hydroxynaphthalene-6-sulphonic acid | bluish-tinged red |
| 114 | 2-Trifluoromethyl-5-(2-chloroethyl)-carbonylaminoaniline | 2-Amino-8-hydroxynaphthalene-6-sulphonic acid | bluish-tinged red |
| 115 | 2-Trifluoromethyl-5-(1-ethylpropyl)-carbonylaminoaniline | 2-Amino-8-hydroxynaphthalene-6-sulphonic acid | bluish-tinged red |
| 116 | 2-Trifluoromethyl-5-(1-ethylpentyl-carbonylaminoaniline | 2-Amino-8-hydroxynaphthalene-6-sulphonic acid | bluish-tinged red |
| 117 | 2-Trifluoromethyl-5-methacryloyl-aminoaniline | 2-Amino-8-hydroxynaphthalene-6-sulphonic acid | bluish-tinged red |
| 118 | 2-Trifluoromethyl-5-(1,2-dibromoethyl)-carbonylaminoaniline | 2-Amino-8-hydroxynaphthalene-6-sulphonic acid | bluish-tinged red |
| 119 | 2-Trifluoromethyl-5-methoxycarbonylaminoaniline | 2-Amino-8-hydroxynaphthalene-6-sulphonic acid | bluish-tinged red |
| 120 | 2-Trifluoromethyl-5-benzylcarbonylaminoaniline | 2-Amino-8-hydroxynaphthalene-6-sulphonic acid | bluish-tinged red |
| 121 | 2-Trifluoromethyl-5-phenoxyacetyl-aminoaniline | 2-Amino-8-hydroxynaphthalene-6-sulphonic acid | bluish-tinged red |
| 122 | 2-Trifluoromethyl-5-dimethylaminocarbonylaminoaniline | 2-Amino-8-hydroxynaphthalene-6-sulphonic acid | bluish tinged red |
| 123 | 2-Trifluoromethyl-5-benzoylaminoaniline | 2-Amino-8-hydroxynaphthalene-6-sulphonic acid | strongly bluish-tinged red |
| 124 | 2-Trifluoromethyl- | 2-Amino-8-hydroxy- | strongly |

TABLE 1-continued

| Example | Diazo component | Coupling component | Colour shade |
|---|---|---|---|
| | 5-(4-chlorobenzoyl)-aminoaniline | naphthalene-6-sulphonic acid | bluish-tinged red |
| 125 | 2-Trifluoromethyl-5-(3-trifluoromethylbenzoyl)-aminoaniline | 2-Amino-8-hydroxy-naphthalene-6-sulphonic acid | strongly bluish-tinged red |
| 126 | 2-Trifluoromethyl-5-(2-chloroethyl)-sulphonylamino-aniline | 2-Amino-8-hydroxy-naphthalene-6-sulphonic acid | bluish-tinged red |
| 127 | 2-trifluoromethyl-5-butylsulphonyl-aminoaniline | 2-Amino-8-hydroxy-naphthalene-6-sulphonic acid | bluish-tinged red |
| 128 | 2-Trifluoromethyl-5-phenylsulphonyl-aminoaniline | 2-Amino-8-hydroxy-naphthalene-6-sulphonic acid | bluish-tinged red |
| 129 | 2-Trifluoromethyl-5-dimethylamino-sulphonylamino-aniline | 2-Amino-8-hydroxy-naphthalene-6-sulphonic acid | bluish-tinged red |
| 130 | 2-Trifluoromethyl-5-acetylamino-aniline | 2-Methylamino-8-hydroxynaphthalene-6-sulphonic acid | bluish-tinged red |
| 131 | 2-Trifluoromethyl-5-acetylamino-aniline | 2-Dimethylamino-8-hydroxynaphthalene-6-sulphonic acid | bluish-tinged red |
| 132 | 2-Trifluoromethyl-5-acetylamino-aniline | 2-(2-Cyanoethylamino)-8-hydroxynaphthalene-6-sulphonic acid | bluish-tinged red |
| 133 | 2-Trifluoromethyl-5-acetylamino-aniline | 2-(2-Hydroxyethyl-amino)-8-hydroxy-naphthalene-6-sulphonic acid | bluish-tinged red |
| 134 | 2-Trifluoromethyl-5-acetylamino-aniline | 2-Butylamino-8-hydroxynaphthalene-6-sulphonic acid | bluish-tinged red |
| 135 | 2-Trifluoromethyl-5-acetylamino-aniline | 2-Cyclohexylamino-8-hydroxynaphthalene-6-sulphonic acid | bluish-tinged red |
| 136 | 2-Trifluoromethyl-5-acetylamino-aniline | 2-(2-Acetylaminoethyl-amino)-8-hydroxy-naphthalene-6-sulphonic acid | bluish-tinged red |
| 137 | 2-Trifluoromethyl-5-acetylamino-aniline | 2-Anilino-8-hydroxynaphthalene-6-sulphonic acid | strongly bluish-tinged red |
| 138 | 2-Trifluoromethyl-5-acetylamino-aniline | 2-Amino-8-hydroxy-naphthalene-5-sulphonic acid | bluish-tinged red |
| 139 | 2-Trifluoromethyl-5-acetylamino-aniline | 2-Methylamino-8-hydroxynaphthalene-5-sulphonic acid | bluish-tinged red |
| 140 | 2-Trifluoromethyl-4-chloro-5-acetyl-aminoaniline | 2-Amino-8-hydroxy-naphthalene-6-sulphonic acid | strongly bluish-tinged red |
| 141 | 2,4-Bis-trifluoromethyl-5-acetyl-aminoaniline | 2-Amino-8-hydroxy-naphthalene-6-sulphonic acid | strongly bluish-tinged red |
| 142 | 2-Trifluoromethyl-4-chloro-5-benzoylaminoaniline | 2-Amino-8-hydroxy-naphthalene-6-sulphonic acid | strongly bluish-tinged red |
| 143 | 2,4-Bis-trifluoromethyl-5-benzoyl-aminoaniline | 2-Amino-8-hydroxy-naphthalene-6-sulphonic acid | strongly bluish-tinged red |
| 144 | 2-Trifluoromethyl-4-chloro-5-acetyl-aminoaniline | 2-Amino-8-hydroxy-naphthalene-5-sulphonic acid | strongly bluish-tinged red |
| 145 | 2,4-Bis-trifluoromethyl-5-acetyl-aminoaniline | 2-Amino-8-hydroxy-naphthalene-5-sulphonic acid | strongly bluish-tinged red |

In Table 2, further polyamide dyestuffs are given which have been obtained by acylating the dyestuff of the formula

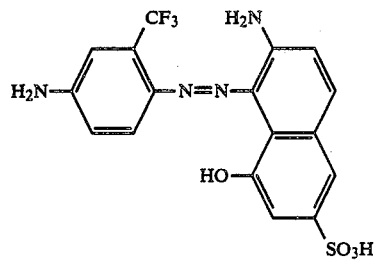

on the amino group of the benzene ring with the acylating agents given in the table.

TABLE 2

| Example | Acylating agent | Colour shade |
|---|---|---|
| 146 | 4-Methylphenyl isocyanate | strongly bluish-tinged red |
| 147 | 2,4-Dimethylphenyl isocyanate | strongly bluish-tinged red |
| 148 | 4-Chlorophenyl isocyanate | strongly bluish-tinged red |
| 149 | 3-Trifluoromethylphenyl isocyanate | strongly bluish-tinged red |
| 150 | Naphthalene-1-carboxylic acid chloride | claret |
| 151 | Thiophene-2-carboxylic acid chloride | claret |
| 152 | Furane-2-carboxylic acid chloride | claret |
| 153 | Pyridine-4-carboxylic acid chloride | claret |
| 154 | Pyridine-3-carboxylic acid chloride | claret |
| 155 | Methanesulphonic acid chloride | strongly bluish-tinged red |
| 156 | Chloromethanesulphonic acid chloride | strongly bluish-tinged red |
| 157 | 2-Chloroethanesulphonic acid chloride | strongly bluish-tinged red |
| 158 | Butanesulphonic acid chloride | strongly bluish-tinged red |
| 159 | Benzenesulphonyl chloride | claret |
| 160 | 4-Toluenesulphonyl chloride | claret |
| 161 | 2-Toluenesulphonyl chloride | claret |
| 162 | 4-Chlorobenzenesulphonyl chloride | claret |
| 163 | 2,4-Dichlorobenzenesulphonyl chloride | claret |
| 164 | 4-Methoxybenzenesulphonyl chloride | claret |
| 165 | 3-Trifluoromethylbenzenesulphonyl chloride | claret |
| 166 | 4-Acetylaminobenzenesulphonyl chloride | claret |
| 167 | 3-Nitrobenzenesulphonyl chloride | claret |
| 168 | Naphthalene-1-sulphonyl chloride | claret |
| 169 | Naphthalene-2-sulphonyl chloride | claret |
| 170 | Cyclohexanesulphonyl chloride | bluish-tinged red |
| 171 | Dimethylsulphamic acid chloride | bluish-tinged red |

Further polyamide dyestuffs are obtained by acylating the dyestuff of the formula

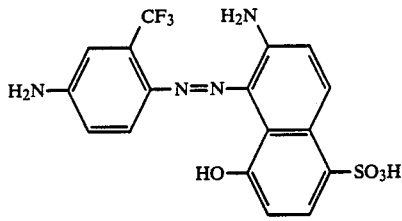

in the benzene amino group with the acylating agents given in Table 3 which follows.

TABLE 3

| Example | Acylating agent | Colour shade |
|---|---|---|
| 172 | Butyl isocyanate | strongly bluish-tinged red |
| 173 | Naphthalene-1-carboxylic acid chloride | violet |
| 174 | Ethanesulphonyl chloride | bluish-tinged red |
| 175 | Benzenesulphonyl chloride | violet |

EXAMPLE 176

42.6 g of the dyestuff of the formula

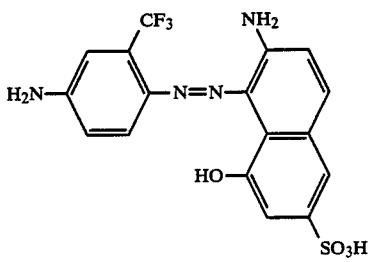

(prepared by reducing the corresponding nitro compound according to Example 2 and isolating the product at pH=7) are dissolved in 300 ml of water and 300 ml of acetone and the solution is cooled to 5° C. 30 g of 5-chloro-2,4,6-trifluoropyrimidine are then added dropwise in the course of 1 hour, whilst stirring well. The pH value is kept at 7 by simultaneously adding 10% strength sodium carbonate solution dropwise. When the amino group in the para-position relative to the azo group has been quantitatively acylated, which can be easily followed by thin layer chromatography, 50 g of sodium chloride are also added and the dyestuff is filtered off. This gives, after drying at about 30° to 40° C. in a vacuum cabinet, 51 g of a dark red powder.

The dyestuff has the formula

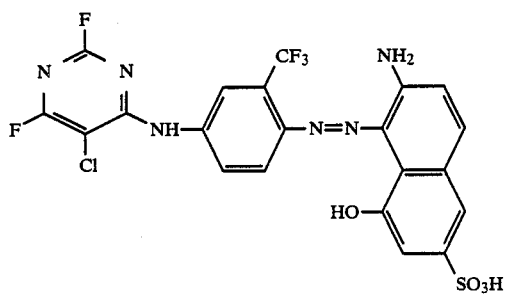

EXAMPLE 177

10 parts of woollen piece goods are put into a dye liquor, which contains, in 500 parts of water, 0.1 part of the dyestuff obtained in Example 176, 0.6 part of acetic acid (30% strength by weight), 0.5 part of anhydrous sodium sulphate and 0.2 part of a surface-active auxiliary, at 40° C. and the liquor is heated to 70° C. in the course of 20 minutes. The material to be dyed is moved by means of glass rods during this procedure and until the dyeing process has ended. After a residence time of 30 minutes at 70° C., the temperature of the dyebath is brought to the boiling point in the course of 30 minutes and the dyebath is kept at this temperature for 60 minutes. The dyed material is then removed from the dye liquor, rinsed with warm and then with cold water and finally dried at 60° to 70° C. This gives a clear, bluish-tinged red dyeing which is distinguished by good fastnesses to light and wet processing.

In Table 4 which follows, further reactive dyestuffs are described which are obtained by acylating the aminoazo dyestuff, used in Example 176, with the acylating agents indicated.

TABLE 4

| Example | Acylating agent | Colour shade |
|---|---|---|
| 178 | Cyanuric chloride | strongly bluish-tinged red |
| 179 | Cyanuric fluoride | strongly bluish-tinged red |
| 180 | 2,4-Dichloro-6-methoxy-1,3,5-triazine | strongly bluish-tinged red |
| 181 | 2,4-Dichloro-6-(2-methylanilino)-1,3,5-triazine | strongly bluish-tinged red |
| 182 | 2,4-Dichloro-6-anilino-1,3,5-triazine | strongly bluish-tinged red |
| 183 | 2,4-Dichloro-6-(2-sulphoanilino)-1,3,5-triazine | strongly bluish-tinged red |
| 184 | 2,4-Dichloro-6-(2,4-disulphoanilino)-1,3,5-triazine | strongly bluish-tinged red |
| 185 | 2,4,5,6-Tetrachloropyrimidine | strongly bluish-tinged red |
| 186 | 2,4,6-Trichloropyrimidine | strongly bluish-tinged red |
| 187 | 2-Methylsulphonyl-4,5-dichloro-6-methylpyrimidine | strongly bluish-tinged red |
| 188 | 2,3-Dichloroquinoxaline-6-carboxylic acid chloride | strongly bluish-tinged red |
| 189 | 2,3-Dichloro-quinoxaline-6-sulphonic acid chloride | strongly bluish-tinged red |
| 190 | 2,4-Difluoro-6-(2,4-disulphoanilino)-1,3,5-triazine | strongly bluish-tinged red |

Further reactive dyestuffs, indicated in Table 5 which follows, are obtained if the aminoazo dyestuff in Example 176 is replaced by the aminoazo dyestuff of the formula

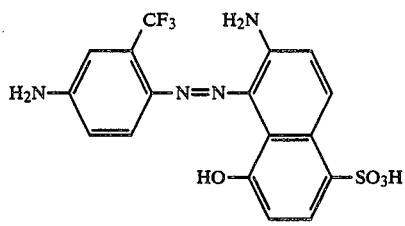

TABLE 5

| Example | Acylating agent | Colour shade |
| --- | --- | --- |
| 191 | 2,4,6-Trifluoro-5-chloropyrimidine | strongly bluish-tinged red |
| 192 | 2,3-Dichloro-6-quinoxalinecarboxylic acid chloride | strongly bluish-tinged red |
| 193 | 2,4-Dichloro-6-(2,4-disulpho-anilino)-1,3,5-triazine | strongly bluish-tinged red |

EXAMPLE 194

According to the Example, a further reactive dyestuff is obtained by diazotising the amine of the formula

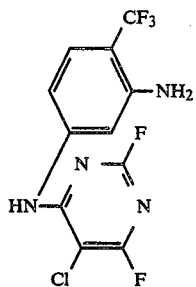

and coupling the diazotisation product with 2-amino-8-hydroxynaphthalene-6-sulphonic acid, colour shade: bluish-tinged red.

EXAMPLE 195

If the diazo component in Example 194 is replaced by the amine of the formula

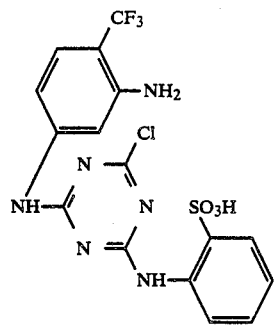

A further bluish-tinged red reactive dyestuff is obtained.

We claim:

1. A dyestuff of the formula

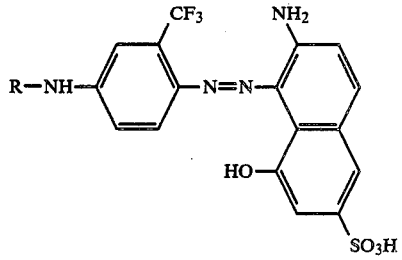

wherein

R is $C_1$–$C_4$-alkylcarbonyl, $C_1$–$C_4$-alkoxy carbonyl or benzoyl.

2. A dyestuff according to claim 1 wherein R is $CH_3CO$.

3. A dyestuff according to claim 1 wherein R is a $C_1$–$C_4$-alkoxycarbonyl.

4. Azo dyestuff according to claim 1, wherein R represents $C_1$–$C_4$-alkylcarbonyl, benzoyl which is optionally substituted by chlorine or methyl, $C_1$–$C_4$-alkylaminocarbonyl or phenylaminocarbonyl which is optionally substituted by methyl or chlorine.

* * * * *

UNITED STATES PATENT AND TRADEMARK OFFICE
CERTIFICATE OF CORRECTION

PATENT NO. : 4,757,137
DATED : Jul. 12, 1988
INVENTOR(S) : Wolfrum et al.

It is certified that error appears in the above-identified patent and that said Letters Patent is hereby corrected as shown below:

Title Page, item [54], line 3 — Delete "DYESTUFFS" and substitute --COMPOUNDS--

Col. 1, line 3 — Delete "DYESTUFFS" and substitute --COMPOUNDS--

Col. 6, line 18 — Insert --aminoaniline-- after "carbonyl-"

Col. 8, line 51 — Delete "4-phenylaminocarbonylaminoaniline" and "naphthalene-5-"

Col. 11, line 31 — Delete ".33" and substitute --133--

Col. 16, line 44 — Delete ", benzoyl which is optionally substituted by chlorine or menthyl, $C_1$-$C_4$-alkylamino-carbonyl or phenylaminocarbonyl which is optionally substituted by methyl or chlorine." and insert --.-- after "alkylcarbonyl"

Signed and Sealed this

Twenty-eighth Day of February, 1989

Attest:

DONALD J. QUIGG

Attesting Officer

Commissioner of Patents and Trademarks